United States Patent
Rakib et al.

(10) Patent No.: US 8,879,378 B2
(45) Date of Patent: Nov. 4, 2014

(54) ORTHONORMAL TIME-FREQUENCY SHIFTING AND SPECTRAL SHAPING COMMUNICATIONS METHOD

(76) Inventors: Selim Shlomo Rakib, Cupertino, CA (US); Ronny Hadani, Austin, TX (US)

(*) Notice: Subject to any disclaimer, the term of this patent is extended or adjusted under 35 U.S.C. 154(b) by 446 days.

(21) Appl. No.: 13/117,119

(22) Filed: May 26, 2011

(65) Prior Publication Data

US 2011/0293030 A1   Dec. 1, 2011

Related U.S. Application Data

(60) Provisional application No. 61/349,619, filed on May 28, 2010.

(51) Int. Cl.
*H04J 11/00* (2006.01)

(52) U.S. Cl.
USPC ............ 370/208; 370/203; 370/209; 375/131

(58) Field of Classification Search
None
See application file for complete search history.

(56) References Cited

U.S. PATENT DOCUMENTS

| | | | |
|---|---|---|---|
| 4,754,493 A | 6/1988 | Coates | |
| 5,956,624 A | 9/1999 | Hunsinger et al. | |
| 6,631,168 B2 | 10/2003 | Izumi | |
| 2001/0033614 A1* | 10/2001 | Hudson | 375/229 |
| 2002/0001308 A1 | 1/2002 | Heuer | |
| 2003/0073464 A1* | 4/2003 | Giannakis et al. | 455/562 |
| 2004/0189581 A1 | 9/2004 | Sako | |
| 2007/0211952 A1* | 9/2007 | Faber et al. | 382/248 |
| 2008/0043857 A1* | 2/2008 | Ribeiro Dias et al. | 375/260 |
| 2008/0310383 A1 | 12/2008 | Kowalski | |
| 2011/0292971 A1 | 12/2011 | Hadani | |
| 2011/0299379 A1* | 12/2011 | Sesia et al. | 370/203 |

FOREIGN PATENT DOCUMENTS

WO  2011/150315  12/2011

OTHER PUBLICATIONS

International Search Report for PCT/US2011/038302, mailed on Nov. 15, 2011.
Office Action for U.S. Appl. No. 13/117,124, mailed on Feb. 22, 2013.

* cited by examiner

*Primary Examiner* — Mohammad Adhami
(74) *Attorney, Agent, or Firm* — Stephen E. Zweig

(57) ABSTRACT

A wireless combination time, frequency and spectral shaping communications method that transmits data in convolution unit matrices (data frames) of N×N ($N^2$), where generally either all $N^2$ data symbols are received over N spreading time intervals (each composed of N time slices), or none are. To transmit, the $N^2$ sized data frame matrix is multiplied by a first N×N time-frequency shifting matrix, permuted, and then multiplied by a second N×N spectral shaping matrix, thereby mixing each data symbol across the entire resulting N×N matrix (TFSSS data matrix). Columns from this $N^2$ TFSSS data matrix are selected, modulated, and transmitted, on a one element per time slice basis. At the receiver, the replica TFSSS matrix is reconstructed and deconvoluted, revealing the data. The method can accommodate multiple users at once, can adapt to changing channel conditions, and is particularly useful for coping with channel impairments such as Doppler shifts.

19 Claims, 10 Drawing Sheets

Building Blocks

Transmitter

Cyclic convolution $[b^{m}*X^{k}]$ is the mth base vector multiplied element wise with the Fourier kth vector

Receiver

Cyclic deconvolution $[b^{m*}X^k]'$ is the mirror conjugate of the mth base vector multiplied element wise with the Fourier kth vector

ORTHONORMAL TIME-FREQUENCY SHIFTING AND SPECTRAL SHAPING COMMUNICATIONS METHOD

This application claims the priority benefit of U.S. provisional application 61/349,619, "ORTHONORMAL TIME-FREQUENCY SHIFTING AND SPECTRAL SHAPING COMMUNICATIONS METHOD", Inventors Selim Shlomo Rakib and Ronny Hadani, filed May 28, 2010; the contents of which are incorporated herein by reference.

BACKGROUND OF THE INVENTION

1. Field of the Invention

The invention is in the general field of communications protocols and methods, more specifically in wireless communications protocols and methods.

2. Description of the Related Art

As wireless communications technology has advanced, the general problem of how to crowd more and more users, each wanting to send and receive more and more amounts of data onto limited regions of the available wireless radio spectrum has increased.

Today, there are a huge number of different portable handheld devices with wireless capability in use. These portable wireless devices (such as cell phones, portable computers, and the like) are often powered by small batteries, and the users typically expect these devices to operate for many hours before the batteries are recharged. To meet these user expectations, the wireless transmitters on these devices must output wireless signals using very small amounts of power, making it difficult to distinguish the wireless radio signal over background noise.

An additional problem is that many of these devices are carried on moving vehicles, such as automobiles, airplanes, and the like. This causes additional complications because the low-power wireless signal transmitted by these devices can also be subjected to various distortions, such as varying and unpredictable Doppler shifts, and unpredictable multi-path effects often caused by varying radio reflections off of buildings or other structures.

And against all these problems, the noise background of the various wireless channels becomes ever higher as noise-producing electrical devices proliferate. The proliferation of other wireless devices also adds to the background noise.

In order to cope with these problems, a number of prior art radio transmission methods, including Time Division Multiple Access (TDMA), the Global System for Mobile Communications (GSM), Code Division Multiple Access (CDMA), Frequency Division Multiple Access (FDMA), Orthogonal Frequency-Division Multiplexing (OFDM), and other wireless protocols have become widespread. Each attempts to solve the above set of problems in a slightly different way.

One of the simplest, yet highly popular, wireless communications schemes is TDMA, In TDMA, a single carrier frequency can be shared with multiple users, and each user is assigned their own particular time-slot, which in turn is interleaved with the time slots reserved for other users.

TDMA forms the basis for the more advanced GSM method, which combines time hopping with frequency hopping, and is the most popular mobile phone protocol in the world today. GSM allocates a number of different frequencies or wavelengths for use, and each wavelength is divided into small timeslots often only a few milliseconds in duration. Thus each wavelength can be shared with about eight to sixteen other users.

By contrast, CDMA is more complex protocol. CDMA is a spread-spectrum protocol that assigns each transmitter a different spreading-code. This spreading-code is usually a pseudo-random number or code that runs at a much higher "chip" rate (a chip is typically a very brief rectangular pulse of +1 or −1 amplitude) than the underlying data signal that the user wishes to transmit. CDMA works by modulating the user's data signal with the high speed pseudo-random spreading code by, often by an exclusive OR (XOR) process, before transmitting the result. This high speed spreading-code effectively distributes the user's data across a broader spectrum of wavelengths, and also provides a convenient way for a receiver to "tune" in to the signal and distinguish the signal from background noise.

By using different pseudo-random numbers, a number of different users can use different spreading codes, and all simultaneously transmit on the same frequency band. At the receiving end, a receiver knowing the proper pseudo-random spreading code can "tune in" to the desired transmitter, and ignore the other signals. The effect of the other users transmitting using different spreading codes on the same frequency band is minimal because their different spreading codes only raise the background noise on the channel by a small amount. Indeed, because spreading codes spread the data across a broader spectral range, spread-spectrum methods such as CDMA are considered to be relatively resistant to background noise.

By contrast, the alternative FDMA protocol works by subdividing the available spectrum into a number of narrow band channels. Users are each assigned a unique frequency or wavelength (a unique narrow band) during each communications session.

The OFDM (also called discrete multi-tone modulation or DMT) protocol also divides the available spectrum into many narrow band channels or tone or spectral-shapes, each separated from each other by a minimal frequency or wavelength separation. These narrow band tone or spectral-shape channels can carry quadrature-amplitude modulated (QAM) signals or phase-shift keyed signals designed to minimally overlap (be orthogonal with) with similar signals carried by adjacent narrow band channels. The OFDM scheme essentially maps out a limited time-frequency grid so that each symbol that is transmitted is allocated a particular time and frequency coordinate. Because the OFDM scheme uses very closely packed channels, as well as carrier modulation schemes chosen for minimal overlap between these many closely packed tone or spectral-shape channels, the method can achieve a relatively high rate of data transmission.

Although the OFDM scheme uses available spectrum fairly efficiently, and thus is popular for both wireless and wired wideband digital communications, the method requires very accurate frequency synchronization between the receiver and the transmitter. Thus the OFDM protocol is relatively sensitive to problems caused by Doppler shift, and these problems are made still worse when reflections off of buildings and other structures cause multi-path effects.

BRIEF SUMMARY OF THE INVENTION

In view of the increasing use of wireless devices in the modern world, there is thus remains an unmet need for communications protocols that are inherently capable of carrying wideband communications using low amounts of power, yet are more resistant to problems of Doppler shift, multi-path reflections, and background noise than previous communications protocols. The invention is a new method of communications intended to accomplish these goals.

Although wireless examples will be used throughout this application, note that wired communications share many of these problems as well. Thus the methods disclosed herein are intended, unless stated otherwise, to cover wired communications methods as well as wireless communications methods.

The invention's method operates by spreading data across time, spectrum, waveform or tone or spectral-shape modulation using novel time-frequency shifting and spectral shaping codes that utilize both time-shifting, frequency-shifting, and spectral shaping to a greater extent than previous methods. The invention's method combines both time-shifting techniques, frequency-shifting techniques, and spectral-shaping techniques that, in some degenerate situations, resembles TDMA, in other degenerate situations resembles CDMA, and in other degenerate situations resembles OFDM, but which in the intended use mode is its own unique method, here called an Orthonormal Time-Frequency Shifting and Spectral Shaping (OTFSSS, or alternatively OTFS$^3$) method. As will be discussed, this OTFSSS method can transmit data at high rates, yet is unusually resistant to problems caused by Doppler shifts, multi-path effects, and background noise.

The invention generally operates by sending data in larger "chunks" or frames than previous methods. That is, while a prior art CDMA or OFDM method might encode and send N symbols over a communications link over a set interval of time, the invention will typically encode a minimum of $N^2$ symbols over longer periods of time, and each data symbol or element that is transmitted is spread out to a much greater extent in time, frequency, and spectral shape space than was the case for prior art methods. As a result the N2 symbols are assembled over a longer period time relative to previous methods, and it also takes longer to start to resolve the value of any given data symbol because this symbol must be gradually built-up or accumulated over a longer period of time.

More specifically, during the transmitting process, the invention will subdivide and transmit each data element or symbol over a cyclically varying range of frequencies over a series of spreading time intervals. Often this will require that each data element or symbol be transmitted over a substantially longer period of time, relative to alternative communications protocols. In order to avoid slowing the data rate down to an unacceptably slow level, however, the invention also utilizes complex multiplexing methods, based on various convolution and deconvolution schemes discussed herein, to pack a comparatively large amount of information into each signal that is sent over the cyclically varying range of frequencies and over a series of spreading time intervals. By proper selection of convolution and deconvolution schemes, the slower data rate that results from splitting a single data element or symbol over N time-spreading intervals can be compensated for by appropriate convolution and deconvolution schemes that send the data in data frames or data matrixes [D] composed of $N^2$ data symbols or elements.

Because each data symbol is subdivided and sent over a plurality of signals, loss of a few of these plurality of signals during the process of transmission and reception need not result in data symbol loss because various signal processing schemes can be employed to compensate for a loss of a few of the plurality of signals. At the same time, losses due to common wireless communications link impairments, such as Doppler shift and multi-path effects, can be more readily compensated for.

For example, whereas with prior art, if by chance Doppler effects caused by one wireless signal from a first transmitter fall on the same frequency as another signal from a first or second transmitter (for multi-path effects, a signal from a moving first or second transmitter that hits an object at an arbitrary angle to the receiver can produce a Doppler distorted reflection or echo signal of the first or second transmitter that also reaches the receiver), this could result in confusion, ambiguity, and data loss. By contrast, according to the invention, by cyclically shifting the frequency and sending an element of data over a plurality of time intervals, the impact of a Doppler "collision" is substantially minimized—at most there will be a brief transient effect resulting in the loss of only one of a plurality of signals used to transmit a particular data symbol or element. The effects of other communications link impairments, such as multi-path effects, can also be minimized because the cyclically shifting frequency provides yet another way to compensate for multi-path effects.

Note that there are at least two basic ways to partition a data element or symbol across a time range of cyclically shifting frequencies, and thus two basic forms of the invention. In the first form of the invention, the data from a single symbol is convoluted and partitioned across multiple time slices, and ultimately transmitted as a series of time slices, on a per time slice basis, somewhat reminiscent of (although quite different from) TDMA schemes, and the cyclically shifting frequency is accomplished over a plurality of time spreading intervals using this transmission scheme. Thus, for the first form of the invention, the basic unit of data transmission operates on a time slice basis.

In the second form of the invention, the data is ultimately transmitted as a series of waveforms with characteristic frequencies, where each waveform lasts for a spreading interval of time generally consisting of N time slices, and the cyclically shifting frequency is accomplished over a plurality of time spreading intervals through this transmission scheme. Thus, for the second form of the invention, the basic unit of data transmission operates over a longer spreading interval of time that may be viewed as generally consisting of N time slices. In general, throughout this disclosure, unless otherwise specified, the discussion will focus on the first, time-slice oriented, form of the invention.

Returning to a discussion of the first basic form of the invention, in one embodiment, the method functions by forming a N×N data frame matrix of $N^2$ symbols or elements, multiplying this data frame by a first N×N time-frequency shifting matrix, optionally permuting this result, and then multiplying the result by a second N×N spectral shaping matrix. As a result, the $N^2$ data elements in the frame of data are essentially mixed or distributed throughout the resulting N×N matrix product here called a "Time Frequency Shifted and Spectral Shaped" data matrix or "TFSSS data matrix". Thus, for example, a single symbol or element in row 1 column 1 of the N×N frame of data may end up being distributed over all rows and columns of the resulting N×N TFSSS data matrix.

The contents (i.e. the individual elements) of this TFSSS data matrix may then be selected, modulated, and transmitted. Usually N elements at a time from this TFSSS data matrix (often a column from the TFSSS data matrix) are selected to be sent over one spreading interval of time, thus often requiring N spreading intervals of time to transmit the entire contents of the TFSSS data matrix. This spreading interval of time in turn is usually composed of at least N time slices. During each time slice, one element from the most recent selection of N elements (for example, from the selected column of the TFSSS data matrix) are selected, modulated, and transmitted.

At the receiving end, the process operates generally in reverse. The individual elements of the TFSSS data matrix are received over various time slices and various time spreading intervals, allowing the receiver to reassemble a replica (which may not be a perfect replica due to communications link impairment effects) of the original TFSSS data matrix. Using its knowledge of the first N×N time-frequency shifting matrix, the optional permutation process, the second N×N spectral shaping matrix, and the selection process used to select different elements of the TFSSS data matrix, as well as various noise reduction or compensation techniques to overcome impairment effects, the receiver will then reconstruct the original N×N data frame matrix of $N^2$ symbols or elements. Because each data symbol or element from the original data frame is often spread throughout the TFSSS data matrix, often most or all of the TFSSS matrix will need to be reconstructed in order to solve for the original data symbol or element. However, by using noise reduction and compensation techniques, minor data losses during transmission can often be compensated for.

This is thus a considerable departure from prior art methods. Consider a communications link otherwise capable of transmitting N matrix elements per time-spreading interval. Prior art methods, such as CDMA methods or OFDM methods might transmit N matrix elements per time spreading interval, and after each time-spreading interval, be able to decode and compute the underlying N data elements. By contrast, in the invention's method, given a communications link with the same capacity, generally N time spreading intervals will be required to transmit $N^2$ matrix elements, and generally most randomly selected data elements cannot decoded before the data has been spread over N time spreading intervals, transmitted over N time spreading intervals, and then received over N time spreading intervals. Thus, in some OTFSSS (OTFS$^3$) embodiments, the overall inherent rate of data transmission (N data elements per spreading time interval) may be the same as alternative methods, but the ability to access the data at intermediate times will be different.

The advantages of this approach in terms of increased ability to cope with communications link impairments will be discussed.

DETAILED DESCRIPTION OF THE INVENTION

Figure 1:
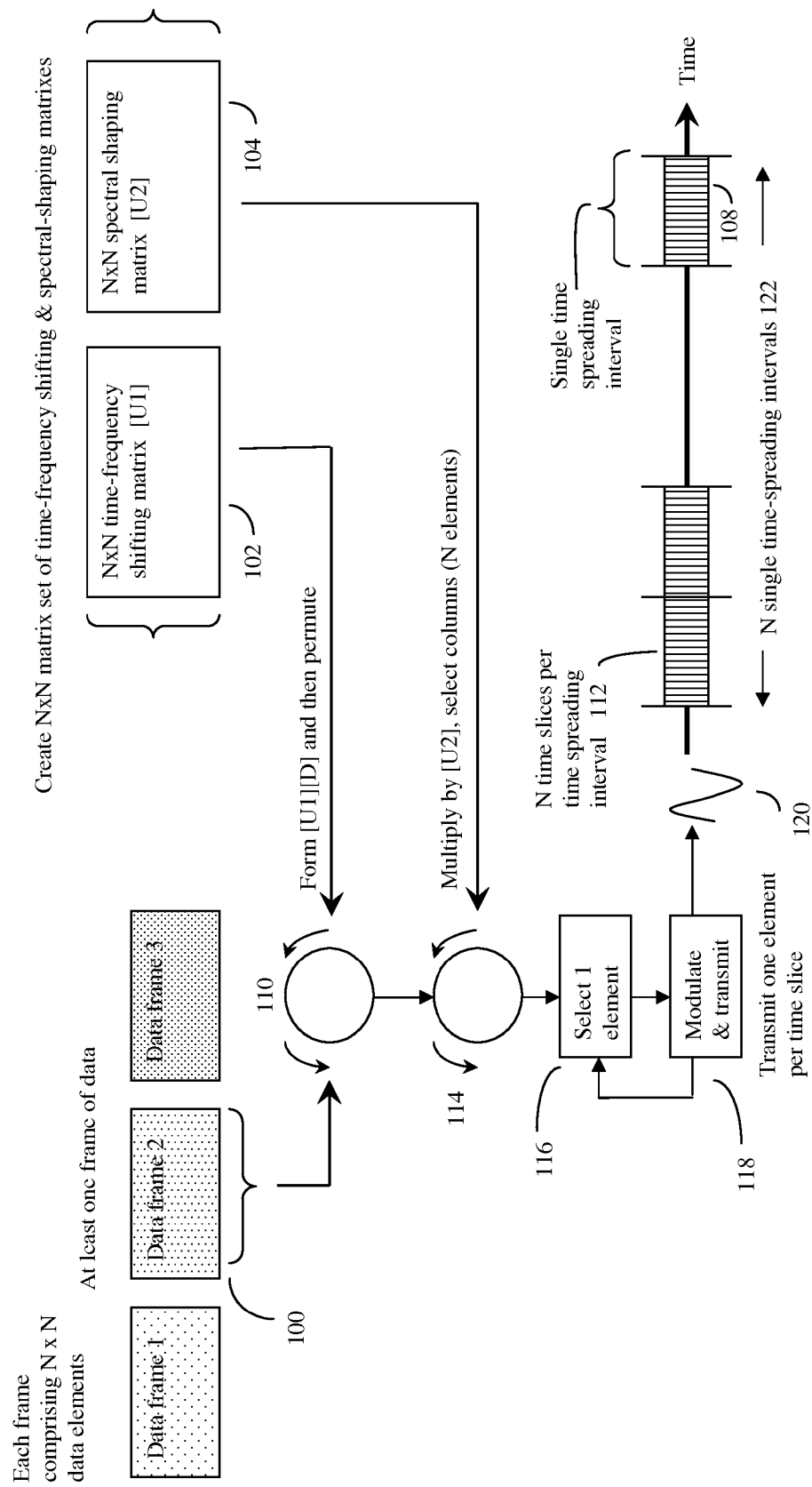
FIG. 1 shows an overview of the OTFSSS method, here being used to transmit data over a wireless link.

A unique aspect of the invention is the concept of spreading the data for a single symbol over a larger range of times, frequencies, and spectral shapes than has been employed by prior art methods. Although previous communication schemes have used methods in which data for a single symbol may be spread over different spectrums (i.e. spread-spectrum methods) in a given time interval, or methods in which data for a single element may be spread over a series of different channels or spectral shapes in a given time interval, or methods in which data for a single symbol may be assigned to be communicated to a particular time slot, one thing that previous methods all had in common was that the data for any given data symbol could be assigned to a unique time-spreading interval or time slice.

By contrast, the invention is based, in part, upon the realization that just as there are advantages to spreading the data to communicate a single symbol over multiple frequencies (e.g. for spread spectrum methods) or multiple spectral shapes, so too if the data to communicate a single symbol was spread over multiple time-spreading intervals as well, there would be certain advantages.

The invention is also based, in part, upon the realization that if the data for any given symbol is spread over time, spectrum, and spectral shapes to a greater extent than had been done previously, then this approach would be more resistant to interference, particularly interference caused by Doppler effects and multi-path effects, as well as general background noise effects. In particular, the invention is less demanding for the need for very accurate frequency synchronization between the receiver and the transmitter, which has plagued prior art methods such as OFDM methods.

In essence, the invention convolutes the data for a group of $N^2$ symbols (herein called a "frame") over both time, frequency, and spectral shape in a way that, because the data for each symbol is spread over a longer period than an otherwise equivalent prior art methods, generally requires that the data for the group of symbols be sent over a longer period of time than otherwise equivalent prior art methods. The invention also requires that the data for any given group of symbols be accumulated over a longer period of time than an otherwise equivalent prior art methods.

However in one significant departure from prior art spread-spectrum methods, such as CDMA, where each different symbol might potentially be transmitted with its own unique pseudo-random spread-spectrum code, the invention may in some embodiments compensate for the any lower data rate (that might be caused by spreading out the data for each symbol over a longer period of time) by data transmission efficiencies that result when a group of symbols are transmitted using the same spread-spectrum code. Although, using prior spread spectrum techniques, such an approach would not be feasible because if multiple symbols are transmitted using the same spreading code, then confusion and ambiguity would result, the invention may, in some embodiments, solve for this confusion and ambiguity by sending the time-spread symbols using different (but previously defined) spread-spectrum convolution methods across the greater number of time and frequency periods, such that when all the data is finally accumulated at the end, the solution for the entire frame or group of symbols can then be solved for. The trade-off is that at the end, as previously discussed generally either an entire multi-symbol frame of data will be received, or none will be (i.e. if there is too much interference, then the ability to successfully deconvolute and retrieve multiple symbols will likely fail). However as will be discussed, the superior ability of this invention's OTFSSS method will generally make this trade-off acceptable.

As a simple way to contrast the differences between the invention's OTFSSS method versus prior art CDMA, OFDM, and TDMA methods, it is important to realize that CDMA primarily convolutes the data signal over the frequency domain, and OFDM primarily convolutes the data signal over a spectral shape domain, and TDMA, although not splitting the data for a particular symbol over multiple time slots, at least has the concept of allocating different users to different time slots. By contrast, the invention's OTFSSS method may convolute the data signal for a single data symbol over both a plurality of time slots, a plurality of frequencies or spectral regions (spread spectrum), and a plurality of spectral shapes. This greater extent of data convolution results in superior performance over impaired communications links.

Alternatively, the invention may be viewed as a method of transmitting and receiving at least one frame of data ([D]) over a communications link, this frame of data comprising a matrix of up to $N^2$ data elements, N being greater than 1. This method comprises convoluting the data elements of said data frame so that the value of each data element, when transmitted, is spread over a plurality of wireless waveforms, each waveform having a characteristic frequency, and each waveform carrying the convoluted results from a plurality of said data elements from the data frame. Further, during the transmission process, cyclically shifting the frequency of this plurality of wireless waveforms over a plurality of times so that the value of each data element is transmitted as a plurality of cyclically frequency shifted waveforms sent over a plurality of times. At the receiving end, receiving and deconvoluting these wireless waveforms thereby reconstructing a replica of said at least one frame of data [D]. Here the convolution process is such that an arbitrary data element of an arbitrary frame of data ([D]) cannot be guaranteed to be reconstructed with full accuracy until substantially all of these wireless waveforms have been transmitted and received.

Matrix Formulation:

Throughout this discussion, the use of matrix terminology should be understood as being a concise description of the various operations that will be carried out by either a communications link transmitter or receiver electronic circuitry (often these instructions will be implemented by a microprocessor, digital signal processor, or other type of electronic integrated circuit device). Thus the series of steps required to obtain the coefficients of a particular matrix generally corresponds to set of instruction for the transmitter or receiver electronic circuitry. For example, one set of coefficients may instruct the transmitter or receiver to perform a spread spectrum operation, a different set of coefficients may instruct the transmitter or receiver to perform a spectral shaping modulation or demodulation operation, and another set of coefficients may instruct the transmitter to perform various time spreading or time accumulation functions. Here standard matrix mathematics is used here as a shorthand way of reciting the very complex series of instructions needed to transmit and receive these complex series of wireless signals.

Thus, when the discussion speaks of multiplying matrices, each data element in the matrix formed by the multiplication can be understood in terms of various multi-step operations to be carried out by the transmitter or receiver electronic circuitry, rather than as a pure number. Thus, for example, a matrix element formed from one matrix that may have spread-spectrum like pseudorandom numbers times another matrix that may have tone or spectral-shape spreading instructions, such as QAM or phase shift keying instructions, times another scanning system, permutation scheme, or matrix that may have data instructions should be understood as directing a transmitter to transmit a radio signal that is modulated according to these three means, or as directing a receiver to receive and demodulate/decode a radio signal that is modulated according to these three means.

Put into matrix terminology, the OTFSSS method of convoluting the data for a group of symbols over both time, spectrum, and tone or spectral-shape can be viewed as transforming the data frame with $N^2$ information elements (symbols) to another new matrix with $N^2$ elements whereby each element in the new transformed matrix, (here called the TFSSS data matrix) carries information about all elements of the original data frame. In other words the new transformed TFSSS data matrix carries a weighted contribution from each element of the original data frame matrix [D]. This TFSSS data matrix is in turn transmitted and received over successive time intervals.

As previously discussed, the invention's method, in which the basic unit of convolution and deconvolution (convolution unit) is composed of $N^2$ symbols or data elements, differs from prior art CDMA and OFDM approaches, which the basic unit of convolution, transmission, reception, and deconvolution operations were focused on smaller convolution units composed of at most only N symbols or data elements.

Additionally, over each time interval, the invention's method will use a different waveform for each data element. By contrast, the prior art OFDM or CDMA methods will generally always use the same waveform for each data element.

For consistency, the $N^2$ units of data will generally be referred to in this specification as a "data frame". N may be any value greater than one, and in some embodiments fall in the ranges between and including 64 to 256.

Thus, for example, if the basic unit of convolution, transmission, reception and deconvolution for a prior art CDMA or OFDM communications protocol is a data frame of n symbols or elements "d" operated on spreading codes that sends the data for N symbols over one spreading interval time where:

$$[D_{1 \times n}] = [d_1 d_2 \ldots d_n]$$

Then by contrast, the invention will take, as the basic unit of convolution, transmission, reception, and deconvolution, a larger data frame composed of $N^2$ elements or symbols "d" that, as will be discussed, will send the data for these $N^2$ elements over a plurality of spreading interval times (often the plurality is N).

$$[D_{n \times n}] = \begin{bmatrix} d_{1,1} & d_{1,2} & \ldots & d_{1,n} \\ d_{2,1} & d_{2,2} & \ldots & d_{2,n} \\ d_{3,1} & d_{3,2} & \ldots & \\ d_{4,1} & d_{4,2} & \ldots & d_{n,n} \end{bmatrix}$$

In general, whenever the specification refers to a frame of data, this should be considered to be a reference to the N×N or $N^2$ matrix such as the one shown above. (Note that at least some elements in the matrix can also be zero or null elements.)

As previously discussed, the invention will spread this group of $N^2$ symbols across a communications link over multiple spreading intervals of time (usually at least N spreading intervals or times), where each individual spreading interval of time is composed of at least N time slices. Note that due to potential overhead required for synchronization and identification purposes, in some embodiments, extra time slices and/or extra spreading intervals of time may need to be allocated for this overhead. Although, in most of this discussion, this overhead will generally be ignored, it should be understood that the disclosure is intended to also encompass methods in which such overhead exists.

The data will thus be transmitted as complex series of waveforms, usually over wireless radio signals with frequencies usually above 100 MHz, and often above 1 GHz or more. These radio frequencies are then usually received over at least n spreading time intervals, where each spreading time interval is often composed of at least n time-slices. Once received, the original data frame will be deconvoluted (i.e. solved for) and the most likely coefficients of the original group of symbols are reconstructed. It should be evident that in order to successfully deconvolute or solve for the original data frame, the receiver will usually have prior knowledge of the time, spectrum, and tone or spectral-shape spreading algorithms used by the transmitter.

According to the invention, mathematically, the process of transmitting a data frame (or a convolution unit) of data, here expressed as an (N by N) or ($N^2$) matrix [D], can be described using standard matrix multiplication math as:

Transmission:
1: Construct the matrix product of a first N×N matrix [$U_1$] and [D] (often written as either [$U_1$]*[D] or more simply [U1][D]—here both the "*" and simple close association (e.g. [$U_1$][D] both are intended to represent matrix multiplication).
2: Optionally permute [$U_1$][D] by a permutation operation P. In general, any invertible permutation operation may be used. P may be an identity operation, or alternatively may be a permutation operation that essentially translates the columns of the original N×N [$U_1$][D] matrix to diagonal elements of a transformed [$U_1$][D]' matrix. Thus P may optionally be of the form:

P Creates a New N×N Matrix:

$$a'_{i,j} = a_{i,(j-i) \bmod n}$$

Where a is the original matrix (here [$U_1$][D]), and a' is the new matrix (here P([$U_1$][D]).

For greater clarity, in this disclosure, the result of this permutation operation will be written as P([$U_1$][D]).
3: Multiply this result by a second N×N [$U_2$] matrix, forming:

[P([$U_1$][D])][$U_2$].

And transmit this signal, according to methods to be discussed shortly.

Here [$U_1$] and [$U_2$] are both unitary N×N matrices, usually chosen to mitigate certain impairments on the (often wireless) communications link, such as wide band noise, narrow-band interference, impulse noise, Doppler shift, crosstalk, etc. To do this, rather than simply selecting [$U_1$] and [$U_2$] to be relatively trivial identity matrices [I], or matrices with most of the coefficients simply being placed along the central diagonal of the matrix, [$U_1$] and [$U_2$] will usually be chosen with non-zero coefficients generally throughout the matrix so as to accomplish the desired spreading or convolution of the convolution unit [D] across spectrum and tone or spectral-shape space in a relatively efficient and uniform manner. Usually, the matrix coefficients will also be chosen to maintain orthogonally or ability to distinguish between the different encoding schemes embodied in the different rows of the respective matrices, as well as minimize autocorrelation effects that can occur when radio signals are subjected to multi-path effects.

In principle, [$U_1$] and [$U_2$] may be a wide variety of different unitary matrices. For example, [$U_1$] may be a Discrete Fourier Transform (DFT) matrix and [$U_2$] may be a Hadamard matrix. Alternatively [$U_1$] may be DFT matrix and [$U_2$] may be a chirp matrix. Alternatively [$U_1$] may be a DFT matrix and [$U_2$] may also be a DFT matrix, and so on. Thus although, for purposes of explaining certain aspects of the invention, certain specific examples and embodiments of [$U_1$] and [$U_2$] will be given, these specific examples and embodiments are not intended to be limiting.

Note that a chirp matrix, [V] is commonly defined in signal processing as a matrix where, if $\Psi$ is the chirp rate, [V]=diag($\Psi, \Psi^2, \ldots \Psi^n$), $\Psi = e^{j\psi}$, and frequency $= e^{j\omega}$ where $\omega$ is the initial center frequency of the spectrum.

Alternatively, an alternative chirp matrix may be used, filled with elements of the form:

$$V_{j,k} = e^{\left(\frac{-i2\pi k j^2}{N}\right)}$$

Where j is the matrix row, k is the matrix column, and N is the size of the matrix.

Other commonly used orthonormal matrices, which may be used for [$U_1$], or [$U_2$] or [$U_3$] (to be discussed), include Discrete Fourier matrixes, Polynomial exponent matrixes, harmonic oscillatory, matrixes, the previously discussed Hadamard matrixes, Walsh matrixes, Haar matrixes, Paley matrixes, Williamson matrixes, M-sequence matrixes, Legendre matrixes, Jacobi matrixes, Householder matrixes, Rotation matrixes, and Permutation matrixes. The inverses of these matrices may also be used.

As will be discussed, in some embodiments, [$U_1$] can be understood as being a time-frequency shifting matrix, and [$U_2$] can be understood as being a spectral shaping matrix. In order to preserve readability, [$U_1$] will thus often be referred to as a first time-frequency shifting matrix, and [$U_2$] will thus often be referred to as a second spectral shaping matrix. However use of this nomenclature is also not intended to be limiting.

Turning to some more specific embodiments, in some embodiments, [$U_1$] may have rows that correspond to Legendre symbols, or spreading sequences, where each successive row in the matrix may be a cyclically shifted version of the Legendre symbols in the row above it. These Legendre symbols will occasionally also be referred to in the alternative as base vectors, and occasionally as spectrum-spreading codes.

In some embodiments, [$U_2$] may chosen to be a Discrete Fourier transform (DFT) matrix or an Inverse Discrete Fourier Transform matrix (IDFT). This DFT and IDFT matrix can be used to take a sequence of real or complex numbers, such as the N×N (P[$U_1$][D]) matrix, and further modulate P([$U_1$][D]) into a series of spectral shapes suitable for wireless transmission.

The individual rows for the DFT and IDFT matrix [$U_2$] will occasionally be referred in the alternative as Fourier Vectors. In general, the Fourier vectors may create complex sinusoidal waveforms (tone or spectral-shapes) of the type:

$$X_j^k = e^{\left(\frac{-i*2*\pi*j*k}{N}\right)}$$

where, for a N×N DFT matrix, X is the coefficient of the Fourier vector in row k column N of the DFT matrix, and j is the column number. The products of this Fourier vector can be considered to be tones or spectral-shapes.

Although certain specific [$U_1$] and [$U_2$] will be used to transmit any given data frame [D], when multiple data frames

[D] are being transmitted, the specific [$U_1$] and [$U_2$] chosen may vary between data frames [D], and indeed may be dynamically optimized to avoid certain communications link impairments over the course of transmitting many data frames [D] over a communications session.

This process of convolution and modulation will normally be done by an electronic device, such as a microprocessor equipped, digital signal processor equipped, or other electronic circuit that controls the convolution and modulation parts of the wireless radio transmitter. Similarly the process of receiving and demodulation will also generally rely upon a microprocessor equipped, digital signal processor equipped, or other electronic circuit that controls the demodulation, accumulation, and deconvolution parts of the wireless radio receiver.

Thus again using matrix multiplication, and again remembering that these are all N×N matrixes, [P([$U_1$][D])][$U_2$] represents the TFSSS data matrix that the transmitter will distribute over a plurality of time spreading intervals, time slices, frequencies, and spectral shapes. Note again that as a result of the various matrix operation and optional permutation steps, a single element or symbol from the original N×N data matrix [D] after modulation and transmission, will be distributed throughout the different time spreading intervals, time slices, frequencies, and spectral shapes, and then reassembled by the receiver and deconvoluted back to the original single data element of symbol.

On the receiving side, the process is essentially done in reverse. Here the time and frequency spread replica of the TFSSS data matrix ([P([$U_1$][D])][$U_2$])' (the 'representing the fact that this is a replica) is accumulated over multiple time spreading intervals, time slices, frequencies, and spectral shapes, and then deconvoluted by a electronic circuit that is essentially the counterpart of the transmitting circuit, that solves for [D] by performing the operation:

Receiving:
1: Receive ([P([$U_1$][D])][$U_2$])'
2: Do a first left multiplication by the Hermetian matrix of the [$U2$] matrix [$U_2^H$], thus creating P([$U_1$][D]).
3: Optionally inverse permute this replica by (P([$U_1$][D])P$^{-1}$, thus creating [$U_1$][D]
4. Do a second right multiplication by the Hermetian matrix of the [$U_1$] matrix $U_1^H$, thus recreating [D].

Note that due to noise and other impairments in the channel, use of information matrices and other standard types of noise reduction methods to compensate for data loss or distortion due to various impairments in the communications link will usually be done. Indeed, one large advantage of spreading out the original elements of the data frame [D] over so large range of times, frequencies, and spectral shapes is that it can be readily appreciated how a loss of a few of the many different times, frequencies and spectral shapes during transmission can be easily compensated for.

Although other deconvolution methods may also be used, Hermitian matrixes are suitable for this application because in general, for any Hermitian matrix [U] of a unitary matrix:

$$[U][U^H]=[I] \text{ where [I] is the identity matrix.}$$

Communications links are not, of course, capable of transmitting data at an infinite rate. Here, the important data rate considerations, from the perspective of implementing the invention, is that the first N×N time-frequency shifting matrix, the second N×N spectral shaping matrix, and the elements of the data frame, as well as the constraints of the communications link (e.g. available bandwidth, power, amount of time, etc.) be chosen so that in balance (and neglecting overhead), at least N elements of the N×N TFSSS data matrix can be transmitted over the communications link in one time-spreading interval. More specifically, (and again neglecting overhead) one element of the N×N TFSSS data matrix will generally be transmitted during each time slice of each time-spreading interval.

Given this rate of communicating data, then typically the entire TFSSS data matrix may be communicated over N time-spreading intervals, and this assumption will generally be used for this discussion. However it should be evident that given other balancing considerations between the first N×N time-frequency shifting matrix, the second N×N spectral shaping matrix, and the elements of the data frame, as well as the constraints of the communications link, the entire TFSSS data matrix may be communicated in less than N time-spreading intervals, or greater than N time spreading intervals as well.

Generally, the contents of the TFSSS data matrix may be transmitted by selecting different elements from the TFSSS data matrix, and sending them over the communications link, on a one element per time slice basis, over multiple spreading time intervals. Although in principle, this process of selecting different elements of the TFSSS data matrix can be accomplished by a variety of different methods, such as sending successive rows of the TFSSS data matrix each single time spreading interval, sending successive columns of the TFSSS data matrix each successive time spreading interval, sending successive diagonals of the TFSSS data matrix each successive time spreading intervals, and so on, from the standpoint of communications link capacity, minimizing interference, and reducing ambiguity, some schemes are often better than others. Thus often the [$U_1$] and [$U_2$] matrix, as well as the permutation scheme P, may be chosen to optimize transmission efficiency in response to various impairments in the communications link.

In general, the process of transmitting (and part of the receiving process) the TFSSS data matrix will follow the steps of:

1: for each single time-spreading interval, selecting N different elements of the TFSSS data matrix (often successive columns of the TFSSS matrix will be chosen).
2: over different time slices in the given time spreading interval, selecting one element (a different element each time slice) from the N different elements of the TFSSS data matrix, modulating this element, and transmitting this element so that each different element occupies its own time slice.
3: receiving these N different replica elements of the replica TFSSS data matrix over different said time slices in the given time spreading interval. Here, at the receiving end, the elements and TFSSS data will be called replica elements and replica TFSSS matrix due to the potentially distorting effects of various communications link impairments.
4: demodulating these N different elements of said TFSSS data matrix.

Repeating steps 1, 2, 3, and 4 up to total of N times, thereby reassembling a replica of said TFSSS data matrix at the receiver.

In some embodiments, there may be some overhead to this basic model. Thus, for example, with some time padding (additional time slices or additional time spreading intervals), checksums or other verification/handshaking data, which could be transmitted in a non-convoluted manner, could be sent back by the receiver to the transmitter on a per time-spreading interval, per N time spreading intervals, or even on a per time slice interval in order to request retransmission of certain parts of the TFSSS data matrix as needed This method assumes that the receiver knows what the first N×N spreading code matrix $[U_1]$ and the second N×N spectral shaping matrix $[U_2]$ are, the permutation scheme P, as well as the particular scheme used to select elements from the TFSSS matrix to transmit over various periods of time. The receiver will essentially take the accumulated TFSSS data matrix at the receiving end, and solve for the original N×N data frame using standard linear algebra methods. Note, however, that because each original data symbol from the original data frame [D] has been essentially "distributed" or "sprinkled" over the entire TFSSS data matrix, and until the complete TFSSS data matrix is received by the receiver and the solution completed, in many situations, there can be no guarantee that an arbitrary element or symbol from an arbitrary frame of data [D] can be reconstructed at the receiver until the number of single time spreading intervals necessary to transmit the complete TFSSS data matrix, which will often be N single time spreading intervals, has been reached (or exceeded).

In order for the transmitter to successfully convolute the data frame, and the receiver then successfully deconvolute the data frame, both the first N×N time-frequency shifting matrix and the second N×N spectral shaping matrix should be unitary matrixes.

As previously discussed, in some embodiments, the first N×N time spreading matrix $[U_1]$ may be constructed out of N rows of a cyclically shifted Legendre symbols or pseudorandom number of length N. That is, the entire N×N spreading matrix is filled with all of the various cyclic permutations of the same Legendre symbols. In some embodiments, this version of the [U1] matrix can be used for spectrum spreading purposes and may, for example, instruct the transmitter to rapidly modulate the elements of any matrix that it affects rapidly over time, that is, with a chip rate that is much faster than the information signal bit rate of the elements of the matrix that the Legendre symbols are operating on.

In some embodiments, the second N×N spectral shaping matrix $[U_2]$ can be a Discrete Fourier Transform (DFT) or an Inverse Discrete Fourier Transform (IDFT) matrix. These DFT and IDFT matrixes can instruct the transmitter to spectrally shift the elements of any matrix that the DFT matrix coefficients act upon. Although many different modulation schemes may be used, in some embodiments, this modulation may be chosen to be an Orthogonal Frequency-Division Multiplexing (OFDM) type modulation, in which case a modulation scheme such as quadrature amplitude modulation or phase-shift keying may be used, and this in turn may optionally be divided over many closely-spaced orthogonal subcarriers.

Often the actual choice of which coefficients to use for the first N×N time-frequency shifting matrix $[U_1]$ and what coefficients to use for second N×N spectral shaping matrix $[U_2]$ may depend on the conditions at hand on the communications link. If, for example, a communications link is suffering a particular type of impairment, such as wide band noise, narrow-band interference, impulse noise, Doppler shift, crosstalk and so on, then some first N×N time-frequency shifting matrixes and some second N×N spectral shaping matrixes will be better able to cope with these impairments. In some embodiments of the invention, the transmitter and receiver will attempt to measure these communications link impairments, and may suggest alternate types of first N×N time-frequency shifting matrixes $[U_1]$ and second N×N spectral shaping matrixes to each $[U_2]$ in order to minimize the data loss caused by the various types of communications channel impairments.

FIG. 1 shows an overview of the OTFSSS method, here being used to transmit data over a wireless link. Here a data frame (100), is an N×N matrix [D] containing $N^2$ symbols or data elements, is the payload intended for transmission. In order to encode this data, the transmitter will select an N×N $[U_1]$ (102) matrix and an N×N $[U_2]$ matrix (104). As previously discussed, in some embodiments, the $[U_1]$ matrix may be a matrix composed of Legendre symbols or a Hadamard matrix. This $[U_1]$ matrix will often be designed to time and frequency shift the symbols or elements in the underlying data matrix [D].

$[U_2]$ (104) may be a DFT or IDFT matrix often designed to spectrally shape the signals. For example in some embodiments, $[U_2]$ may contain the coefficients to direct the transmitter circuits to transform the signals over time in a OFDM manner, such as by quadrature-amplitude modulation (QAM) or phase-shift keying, or other scheme.

Usually [D] (100) will be matrix multiplied by $[U_1]$ (102), and the matrix product of this operation $[U_1][D]$ then optionally permuted (110) forming $P([U_{41}][U_2])$. In the next step 114), this matrix is in turn multiplied by $[U_2]$ (104) forming an N×N TFSS data matrix.

The various elements of the TFSSS matrix are then selected, usually a column of N elements at a time, on a single element at a time basis, (116) the elements are then prepared for modulation and transmission (118). During the modulation and transmission process, during each time slice, the particular real and imaginary components of that individual TFSSS matrix element are used to control a time variant radio signal (120). This process is shown in more detail in FIG. 10).

Thus one column of the TFSSS matrix will be usually sent in one single time spreading interval (108), where each element from this column is sent in one time slice (112). Neglecting overhead effects, generally a complete N×N TFSSS matrix can be transmitted over N single time spreading intervals (122).

Figure 2:
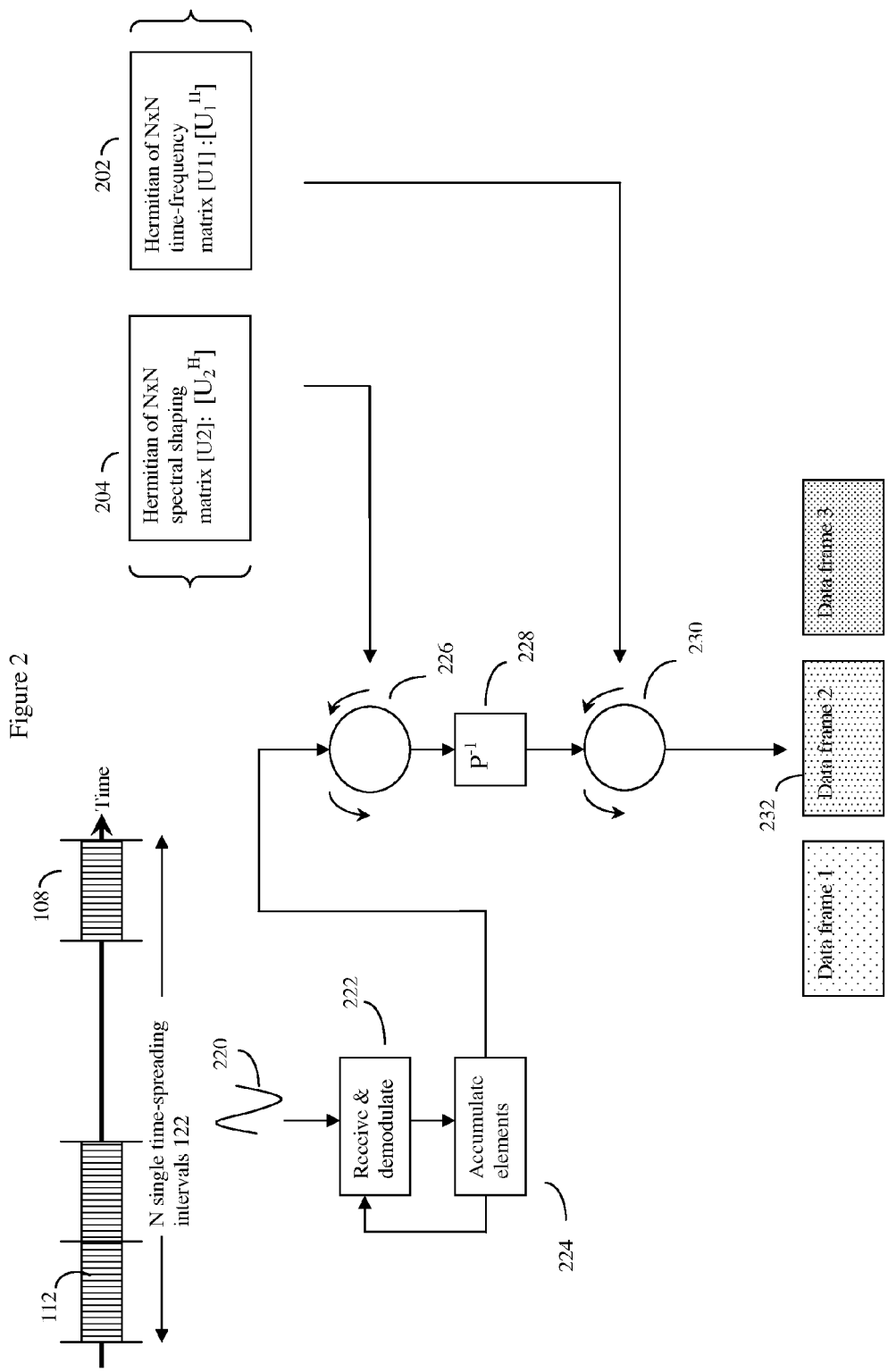
FIG. 2 shows an overview of the OTFSSS method, here being used to receive data over a wireless link.

FIG. 2 shows an overview of the OTFSSS method, here being used to receive data over a wireless link. Just as the transmitter is often a hybrid analog/digital device, capable of performing matrix calculations in the digital portion and then converting the results to analog signals in the analog portion, so to the receiver will be capable of receiving and demodulating the radio signals in the receiver's analog portion, and then often decoding or deconvoluting these signals in the receiver's digital portion. Here the original radio signals (120) are received, but are not an exact copy of the original transmitted signals because the received radio signals will often have additional artifacts, impairments, or distortions caused by various communications link impairments. Thus the impaired counterparts of original signal (120) are shown in FIG. 2 as (220). Thus replicas of the original elements of the TFSSS matrix are received and demodulated (222) every time slice (112), often one column every spreading time interval (108), and the receiver will accumulate these elements over N single time spreading intervals (124), eventually accumulating enough elements (224) to create a replica of the original TFSSS matrix.

In order to decode or deconvolute this TFSSS matrix, in the digital portion of the receiver, the matrix will usually first be left multiplied by the Hermetian matrix of the $[U_2]$ matrix $[U_2^H]$ (204), and then subjected to an inverse permutation step $P^{-1}$ (226). Next the TFSSS matrix will be deconvoluted back to the original data matrix [D], by right multiplying (230) by the Hermetian of the original N×N time-frequency shifting matrix $[U_1]$, which is $[U_1^H]$ (202). Because usually the reconstructed signal will have some noise and distortion due to various communications link impairments, usually various standard noise reduction and statistical averaging techniques, such as information matrices, may be used to assist in this process (not shown). At the end of this process, the original data matrix [D] can be reconstructed.

Multiple Users

Note that this approach can also be used to simultaneously send data from multiple users using multiple transmitters (here usually referred to as the multiple transmitter case).

For example, assume multiple users "a", "b", "c", and "d", each sending the equivalent of one prior art frame of data with only N elements using the invention's scheme.

Each user can repackage their N elements of data into the invention's larger $N^2$ frame of data by using a scheme in which each user packages their data matrix [D] according to the following scheme, where each user packs the data into one column of their respective data frame, and leaves the other columns empty (coefficients set to zero).

User "a" sends N frames of "a" data as:

$$[D_a] = \begin{bmatrix} a_{1,1} & 0_{1,2} & \cdots & 0_{1,n} \\ a_{2,1} & 0_{2,2} & \cdots & 0_{2,n} \\ \cdots & \cdots & \cdots & \cdots \\ a_{n,1} & 0_{n,2} & \cdots & 0_{n,n} \end{bmatrix}$$

User "b" sends N frames of "b" data as $$[D_b] = \begin{bmatrix} 0_{1,1} & b_{1,2} & \cdots & 0_{1,n} \\ 0_{2,1} & b_{2,2} & \cdots & 0_{2,n} \\ \cdots & \cdots & \cdots & \cdots \\ 0_{n,1} & b_{n,2} & \cdots & 0_{n,n} \end{bmatrix}$$

And user "n" sends N frames of "n" data as $$[D_n] = \begin{bmatrix} 0_{1,1} & 0_{1,2} & \cdots & n_{1,n} \\ 0_{2,1} & 0_{2,2} & \cdots & n_{2,n} \\ \cdots & \cdots & \cdots & \cdots \\ 0_{n,1} & 0_{n,2} & \cdots & m_{n,n} \end{bmatrix}$$

Since each independent user "a", "b" . . . "n" can know what their designated slot on the data matrix is, then all can transmit on the same channel (same communications link). The signals will sum up gracefully, and the various signals $[D_a], [D_b] \ldots [D_n]$ can be received at the receiver as if it was a complete data frame sent by only one transmitter, and deconvoluted as before.

As previously discussed, one advantage of the invention's approach is increased resistance to Doppler shifts and frequency shifts. For example, consider what would happen if the signals transmitted by any of the different users "a", "b" . . . "n" are frequency shifted. If a prior art wireless transmission method, such as OFDM was used, the frequency shifts and time shifts would cause a substantial amount of interference with other wireless devices that are transmitting and receiving in neighboring areas. By contrast, by using the invention's OTFSSS method, only the wireless devices transmitting on adjacent (i.e. on a local row or column on the matrix) regions of the TFSSS data matrix to the affected wireless device will be affected.

In many cases, due to the invention's greater degree of time, frequency, and spectral shaping, the net effect of the impaired device will be largely transparent due to the invention's superior ability to function over an impaired communications link. In other cases, because the local impaired device can be identified with greater accuracy, the base station can either send corrective signals to the impaired device, or alternatively shut off the impaired device.

Returning to the specific case where $[U_1]$ may have rows that correspond to pseudo-random sequences, it may be useful to employ a scheme where each successive row in the matrix is a cyclically rotated version of the pseudo-random sequence in the row above it. Thus the entire N×N matrix may consist of successive cyclically rotated versions of a single pseudo-random sequence of length N.

In an alternative embodiment, after the matrix multiplication steps, the system may then transmit the diagonals of the resulting matrix over a series of single time-spreading intervals, one diagonal per single time-spreading interval, so that N (or more generally N data elements) columns of the final N by N matrix are transmitted over N time intervals.

The order in which the individual elements of the TFSSS data matrix $[[U_1][D]][U_2]$ are transmitted across the communications link can alternatively be controlled by a Transmit Matrix or Transmit Vector.

Figure 3:
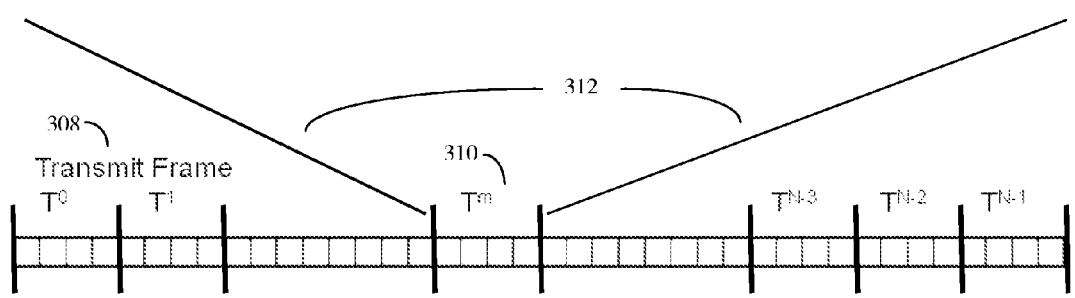
FIG. 3 shows an example of some of the basic building blocks (base vector, data vectors, Fourier Vector and Transmit vectors) used to convolute and deconvolute data according to the second form of the invention.
Figure 4:
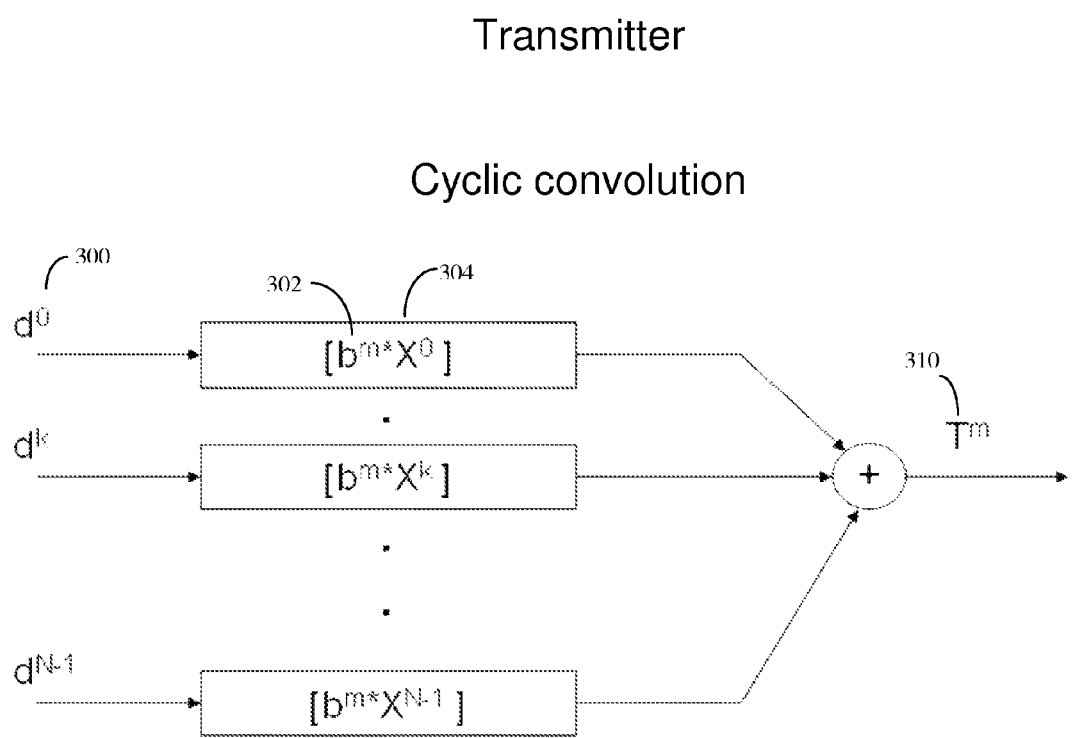
FIG. 4 shows a diagram of the cyclic convolution method used to convolute data and transmit data according to the second form of the invention.
Figure 5:
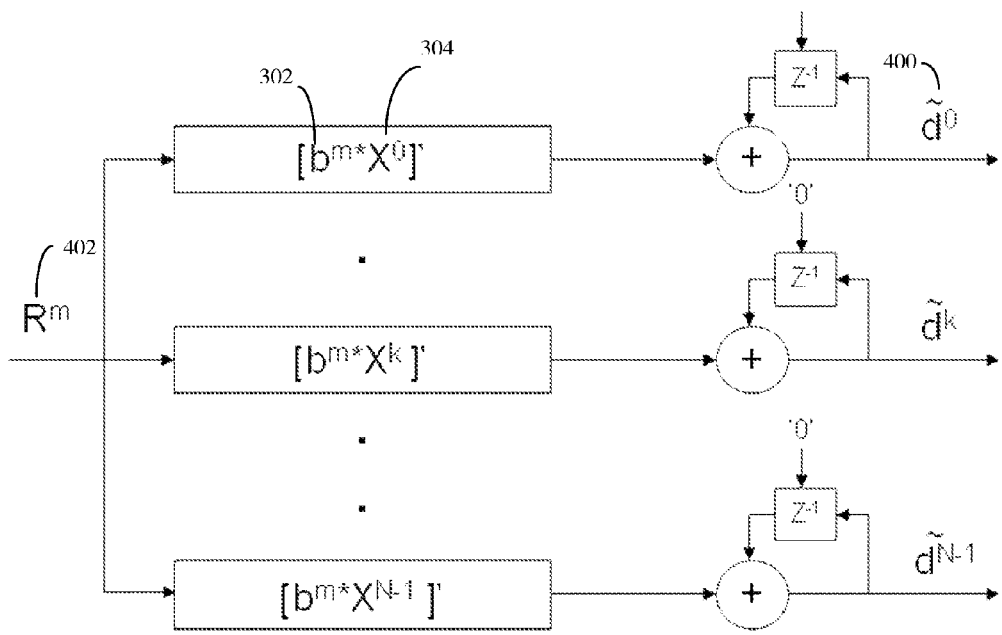
FIG. 5 shows a diagram of the cyclic deconvolution method used to deconvolute received data according to the second form of the invention method.

For FIGS. 3, 4, and 5, we will briefly depart from the discussion of the first form of the invention, in which data is transmitted on a per time slice basis, and briefly discuss the second form of the invention, in which data is transmitted by an alternative process in which the underlying unit of transmission is not in the form of brief pulses on a time slice basis, but rather as a series of waveforms that last for a spreading interval of time, that is generally over N time slices.

The general concept for the second form of the invention is that although it also is a method of transmitting and receiving at least one frame of data [D] (composed of a matrix of up to $N^2$ data elements) over a communications link, in this second form, each data element is assigned a unique waveform (designated a corresponding waveform) which is derived from a basic waveform of duration N time slices. However like the first form of the invention, the second form of the invention also has the net effect of spreading the data elements of the data matrix [D] over a range of times and cyclic frequency shifts using a different underlying process.

In the second form of the invention, each data element is assigned a unique waveform (corresponding waveform) which is derived from a basic waveform of length N time slices, with a data element specific combination of a time and frequency cyclic shift of this basic waveform.

In the second form of the invention, each element in the frame of data [D] is multiplied by its corresponding waveform, producing a series of $N^2$ weighted unique waveforms. Over one spreading time interval (generally composed of N time slices), all $N^2$ weighted unique waveforms corresponding to each data element in said frame of data [D] are simultaneously combined and transmitted. Further, a different unique basic waveform of length (or duration) of N time slices is used for each consecutive time-spreading interval. wherein a different unique basic waveform of length N time slices is used for each consecutive time-spreading interval, and this set of N unique waveforms form an orthonormal basis. Essentially, each element of [D] is transmitted (in part) again and again over all N time spreading intervals.

To receive data using this second form of the invention, over each spreading interval of time (again composed of N time slices), the received signal is correlated with the set of all $N^2$ waveforms previously assigned to each data element by said transmitter for that specific time spreading interval. (Thus just like other encoding/decoding methods, this second form of the invention also requires that the receiver have knowledge of the set of $N^2$ waveforms that the transmitter will assign to each data element.). Upon performing this correlation, the receiver will produce a unique correlation score for each one of the $N^2$ data elements. This process will be repeated over all N time-spreading intervals. The original data matrix [D] can thus be reconstructed by the receiver by, for each data element, summing the correlation scores over N time-spreading intervals, and this summation of the correlation scores will reproduce the $N^2$ data elements of the frame of data [D].

FIG. 3 shows an example of some of the basic building blocks (base vector, data vectors, Fourier Vector and Transmit vectors) used to convolute and deconvolute data according to the second form of the invention. Here the data vector (300) can be understood as being N elements (often one row, column, or diagonal) of the N×N [D] matrix, the base vector (302) can be understood as being N elements (often one row, column, or diagonal) of the N×N $[U_1]$ matrix, the Fourier vector (304) can be understood as being N elements (often one row, column, or diagonal) of the N×N $[U_2]$ matrix often a DFT or IDFT matrix. The transmit vector (306) can be understood as controlling the scanning process, and the transmit frame (308) is composed of units Tm (310) each of which is essentially a spreading time interval, itself composed of a plurality of time slices. Thus the transmit vector can be understood as containing N single time-spreading intervals (122) (310), which in turn are composed of multiple (such as N) time slices.

Note the difference in wireless radio signal modulation between this second form of the invention, where each waveform exists over a time spreading interval composed of multiple (e.g. N) time slices, and the first form of the invention, where the wireless signal is essentially transmitted on a per time slice basis. This is represented by lines (312) showing that each Fourier vector waveform (304) is manifested over the spreading time interval $T^m$ (310).

FIG. 4 shows a diagram of a cyclic convolution method that may be used to convolute data and transmit data according to the second form of the invention. As previously discussed, particularly in the case where $[U_1]$ is composed of a cyclically permuted Legendre number of length N, then the matrix math process of convoluting the data and scanning the data can be understood alternatively as being a cyclic convolution of the underlying data. Here the $d^0$, $d^k$, $d^{N-1}$ can be understood as being the elements or symbols of the data vector (300) component of the [D] matrix, the $b^m$ coefficients can be understood as representing the base vector (302) components of the $[U_1]$ matrix, and the X coefficients can be understood as representing the Fourier vector (304) components of the $[U_2]$ matrix.

FIG. 5 shows a diagram of a cyclic deconvolution method that may be used to deconvolute received data according to the second form of the invention. Again, as previously discussed, particularly in the case where $[U_1]$ is composed of a cyclically permuted Legendre number of length N, then the matrix math process of deconvoluting the data and reconstructing the data can be understood alternatively as being a cyclic deconvolution of the transmitted data previously convoluted in FIG. 4. Here the $\sim d^0$, $\sim^k$, $\sim d^{N-1}$ can be understood as being the reconstructed elements (symbols) of the data vector (400) component of the [D] matrix, the $b^m$ coefficients again can be understood as representing the base vector (302) components of the $[U_1]$ matrix, and the X coefficients can again be understood as representing the Fourier vector (304) components of the $[U_2]$ matrix. Here $(R_m)$ (402) is a portion of the accumulated signal (230) received and demodulated by the receiver.

In this alternative scheme or embodiment, the invention can be understood as being a method of transmitting at least one frame of data ([D]) over a communications link, comprising: creating a plurality of time-spectrum-tone or spectral-shape spreading codes operating over a plurality of time-spreading intervals, each single time-spreading interval being composed of at least one clock intervals; each time-spectrum-tone or spectral-shape spreading code comprising a function of a first time-frequency shifting, a second spectral shaping, and a time spreading code or scanning and transmission scheme.

If the single time-spreading interval was only composed of one time-slice or clock interval, then the system could be viewed as essentially degenerating into a TDMA-like transmission method. If the time-frequency shifting was a constant, then the system could be viewed as essentially degenerating into an OFDM-like method. If the spectral shaping was a constant and the time-spreading interval was a plurality of clock intervals, then the system could be viewed as essentially degenerating into a CDMA-like method.

Returning to a discussion of the first form of the invention, some variations on the basic $[[U_1][D]][U_2]$ data transmission and reconstruction process are also possible, and these variations are shown in more detail in FIGS. 6 to 9.

Figure 6:
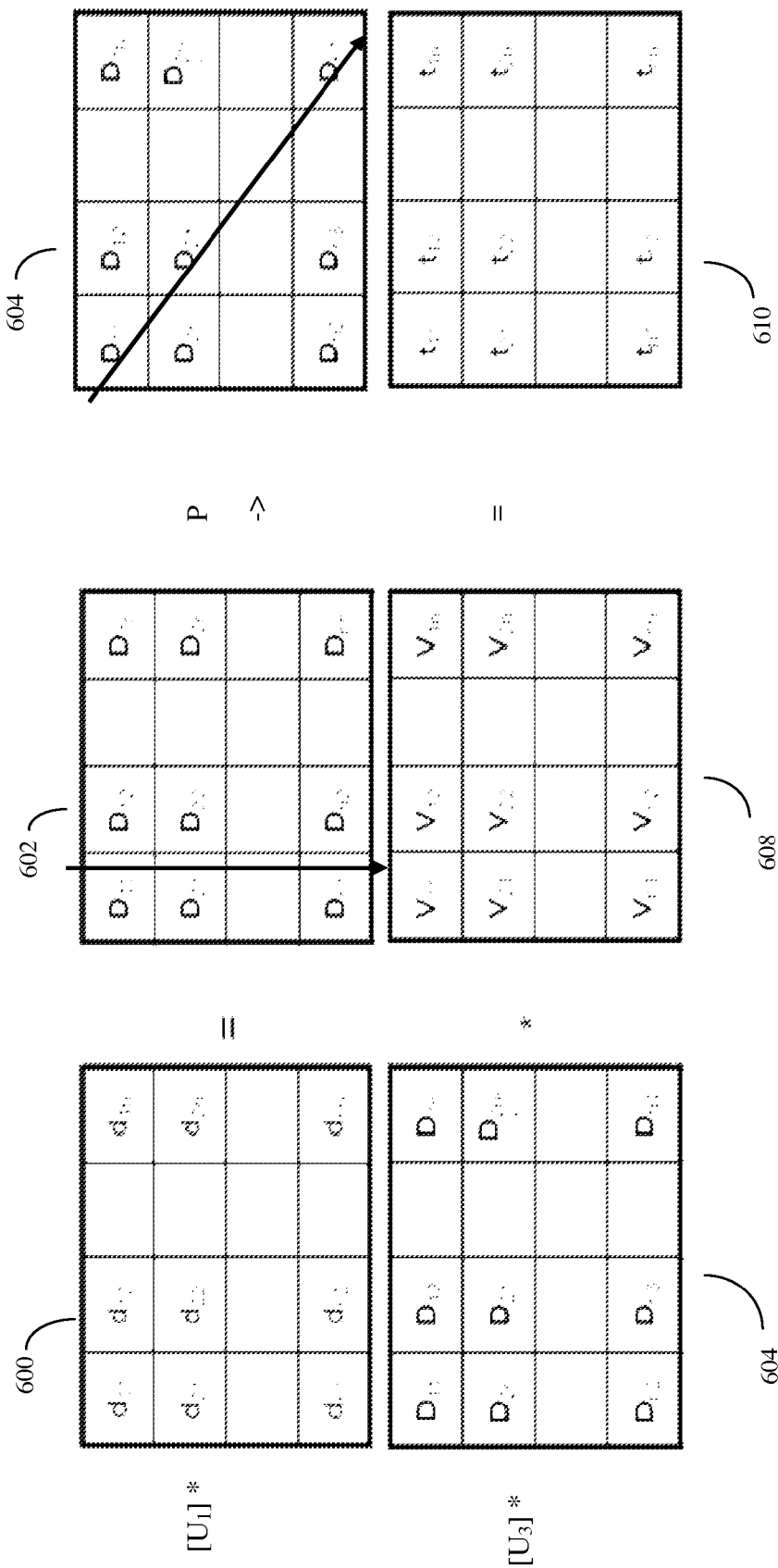
FIG. 6 shows a transmitter following a first alternative OTFSSS scheme.

FIG. 6 shows a first transmitter scheme following a first alternative scheme. Here the data matrix [D] may be further convoluted by means of a third unitary matrix $[U_3]$, which may be an IDFT matrix. Here [U1] may be a DFT matrix, and $[U_2]$ may be the product of a DFT matrix times a base. In this scheme, the process of scanning and transmitting the data is represented by the previously described permutation operation P. The basic transmission process can thus be represented as $[U_3]*[P([U_1][D])]*[U_2]$. Here [D] is shown as (600), and $([U_1][D])$ is shown as (602). The permuted version of this, $P([U_1][D])$ is shown as (604). $[U_3]$ is shown as (606), $[U_2]$ is shown as (608), and the final product $[U_3][P([U_1][D])][U_2]$ is shown as (610). Note that [U3] can be a DFT matrix, an IDFT matrix, or a trivial identity matrix (in which case this first alternative scheme reduces back to schemes where [U3] is not invoked at all).

Some of the effects of the permutation operation P are symbolized by the changing location of the arrow from the column of (602) to the diagonal of (604).

Figure 7:
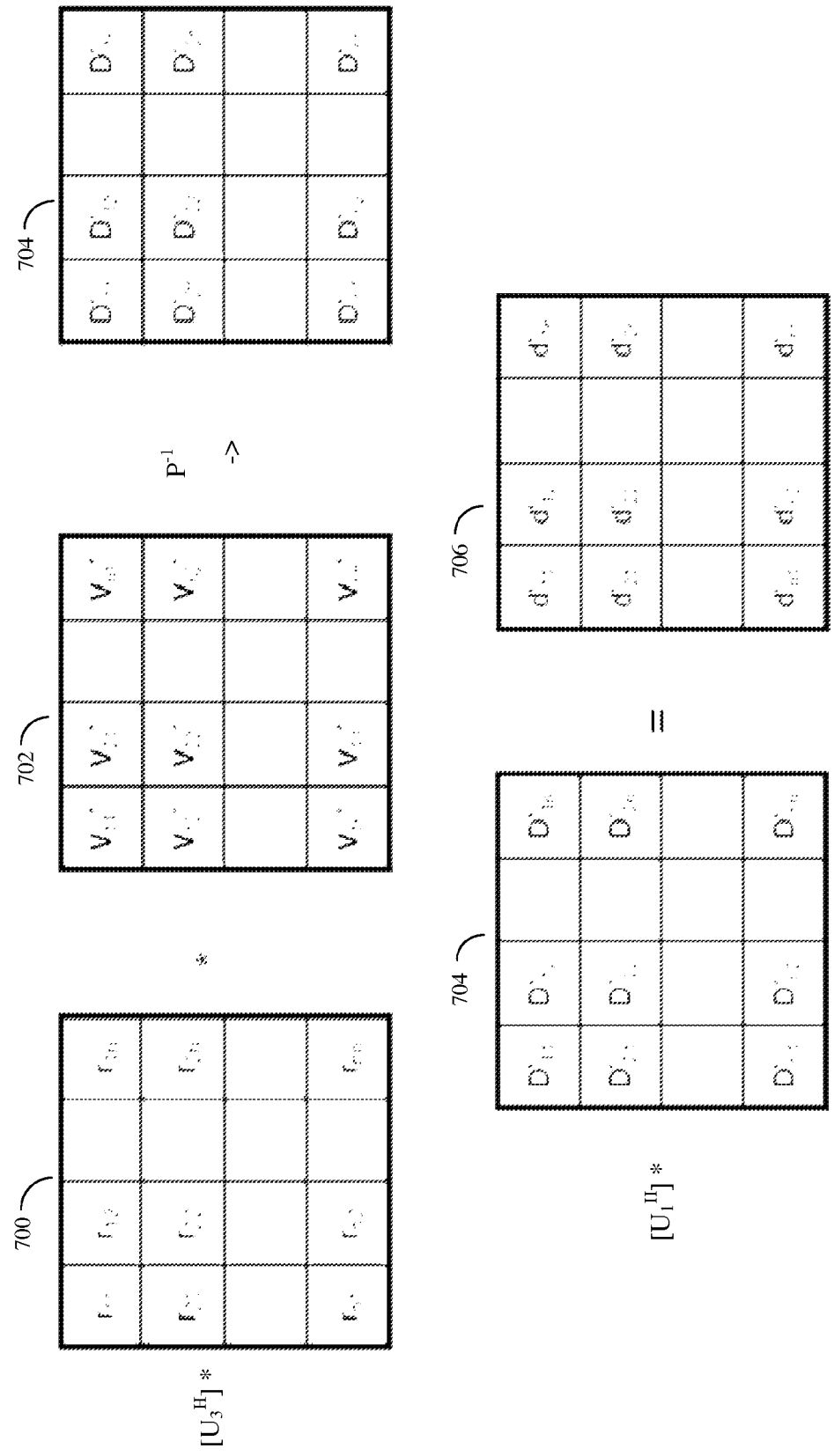
FIG. 7 shows a receiver following this first alternative OTFSSS scheme.

FIG. 7 shows a receiver following this first alternative scheme. Here the data that the transmitter has received and accumulated, after various communications link impairment effects, is represented as the [r] matrix. The [r] matrix is demodulated and deconvoluted (decoded) by forming the Hermetian matrices of the original $[U_1]$, $[U_2]$, and $[U_3]$ matrices originally used to encode and modulate the data [D], as well as the inverse permutation operation $P^{-1}$ to undo the original permutation operation P used to scan and transmit the data over multiple time intervals. Here $[U_1^H]$ may be an IDFT matrix, $[U_3^H]$ may be a DFT matrix, and $[U_2^H]$ may be a DFT matrix times a base.

Here [r] is (700), $[U_2^H]$ is (702), and $P^{-1}([U_3^H][r][U_2^H])$ is (704), and the reconstructed data matrix [D] is (706).

Figure 8:
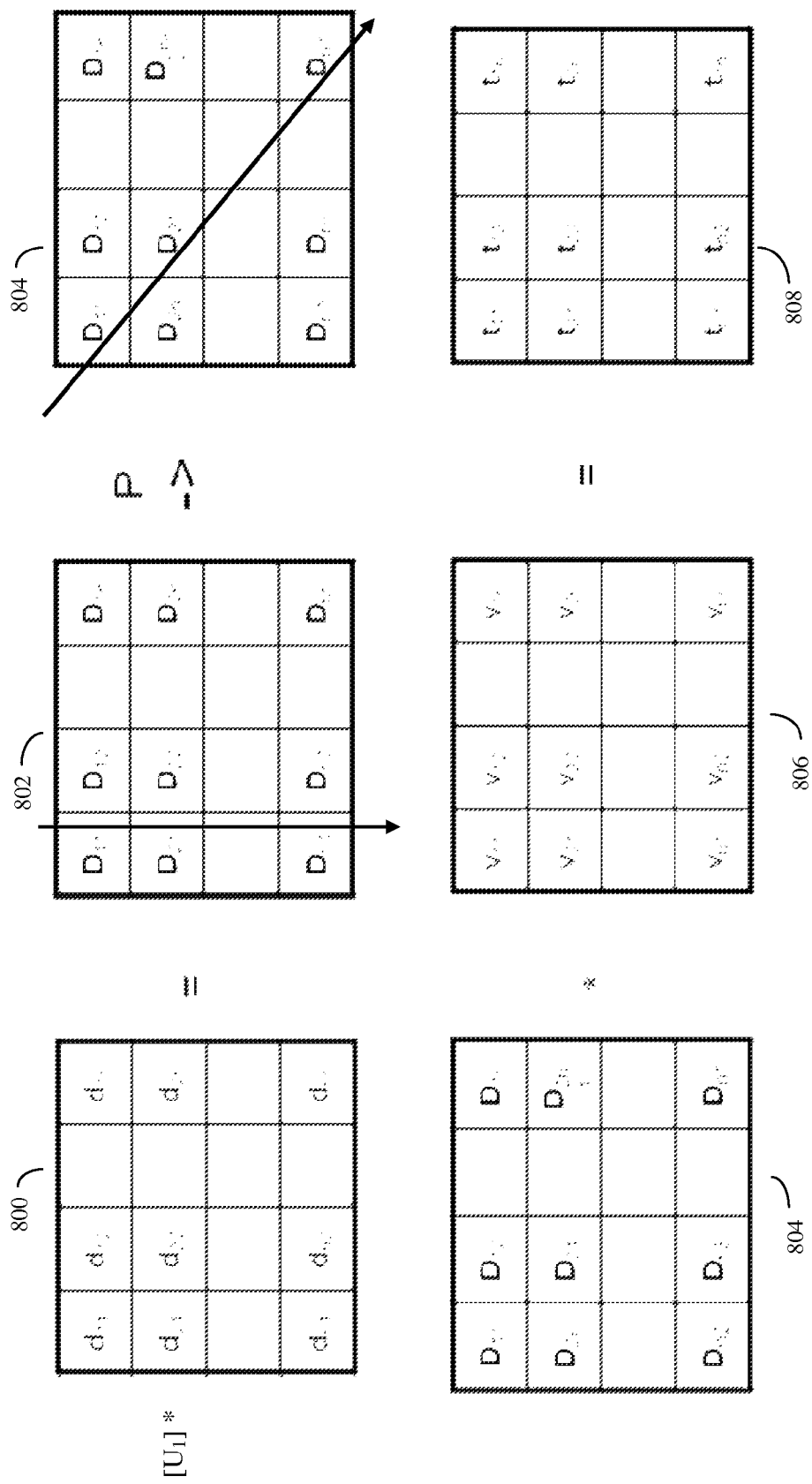
FIG. 8 shows a transmitter following a second alternative OTFSSS scheme.

FIG. 8 shows a transmitter following a second alternative scheme. Here the original data matrix [D] is (800), $[U_1][D]$ is (802), and $P([U_1][D])$ is (804). $[U_2]$ is (806), and the transmitted signal, which is $[P([U_1][D])]*[U_2]$ is (808). Here $[U_1]$ may be a Hadamard matrix (i.e., a square matrix composed of mutually orthogonal rows and either +1 or −1 coefficients. This matrix has the property that $H*H^T=nI_n$ where $I_n$ is an n×n identity matrix and $H^T$ is the transpose of H). Some of the effects of the permutation operation P are symbolized by the changing location of the arrow from the column of (802) to the diagonal of (804).

Figure 9:
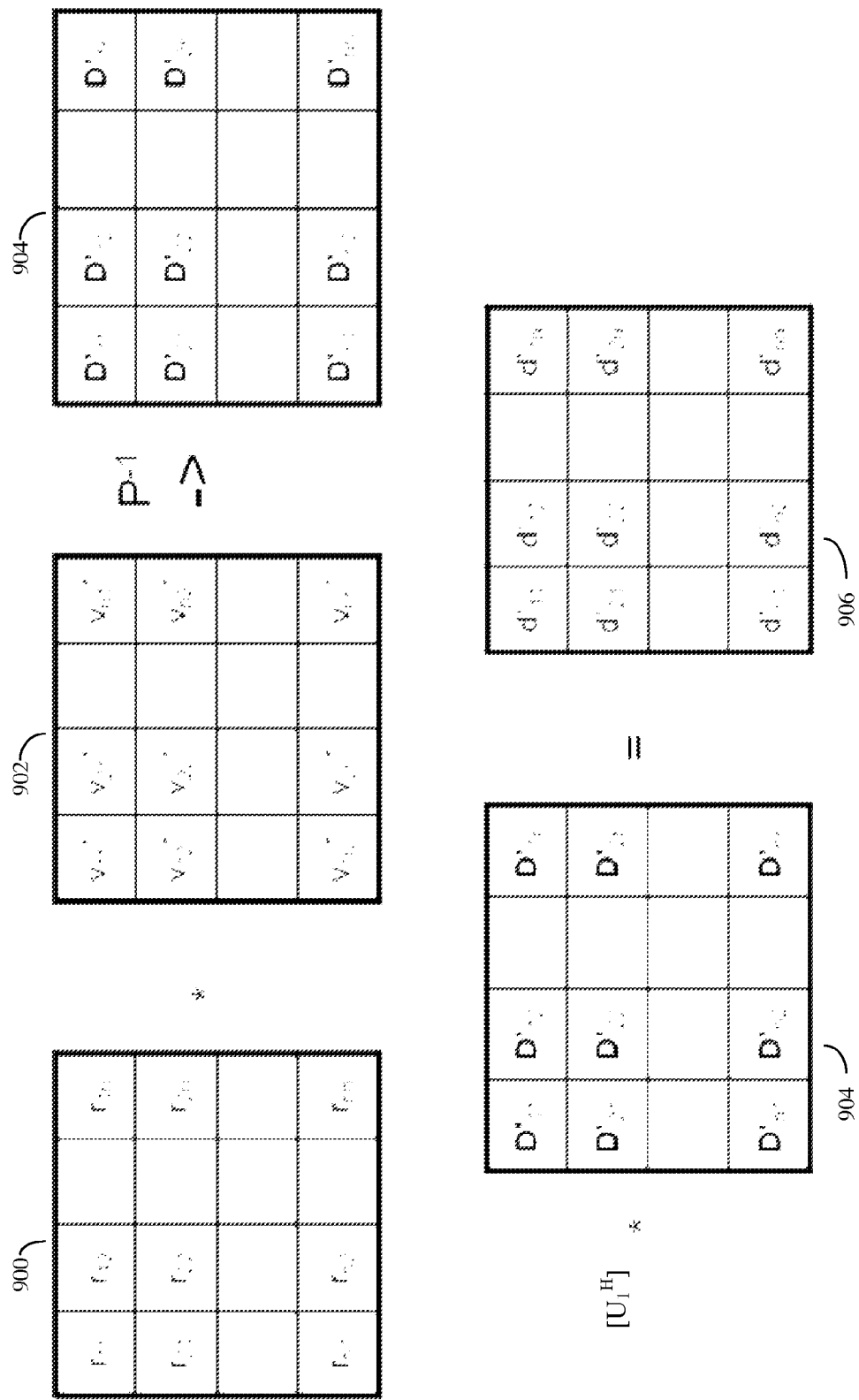
FIG. 9 shows a receiver following this second alternative OTFSSS scheme.

FIG. 9 shows a receiver following this second alternative scheme. Here [r] again symbolizes the received data. As before, the [r] matrix is demodulated and deconvoluted (decoded) by forming the Hermetian matrices of the original [$U_1$], and [$U_2$], matrices originally used to encode and modulate the data [D], as well as the inverse permutation operation $P^{-1}$ to undo the original permutation operation P used to scan and transmit the data over multiple time intervals. Here [r] is (900), [$U_2^H$] is (902), $P^{-1}([r][U_2^H])$ is (904) and the reconstructed data matrix [D] (created from $[U_1^H]*P^{-1}([e]*[U_2^H]))$ is (906).

Figure 10:
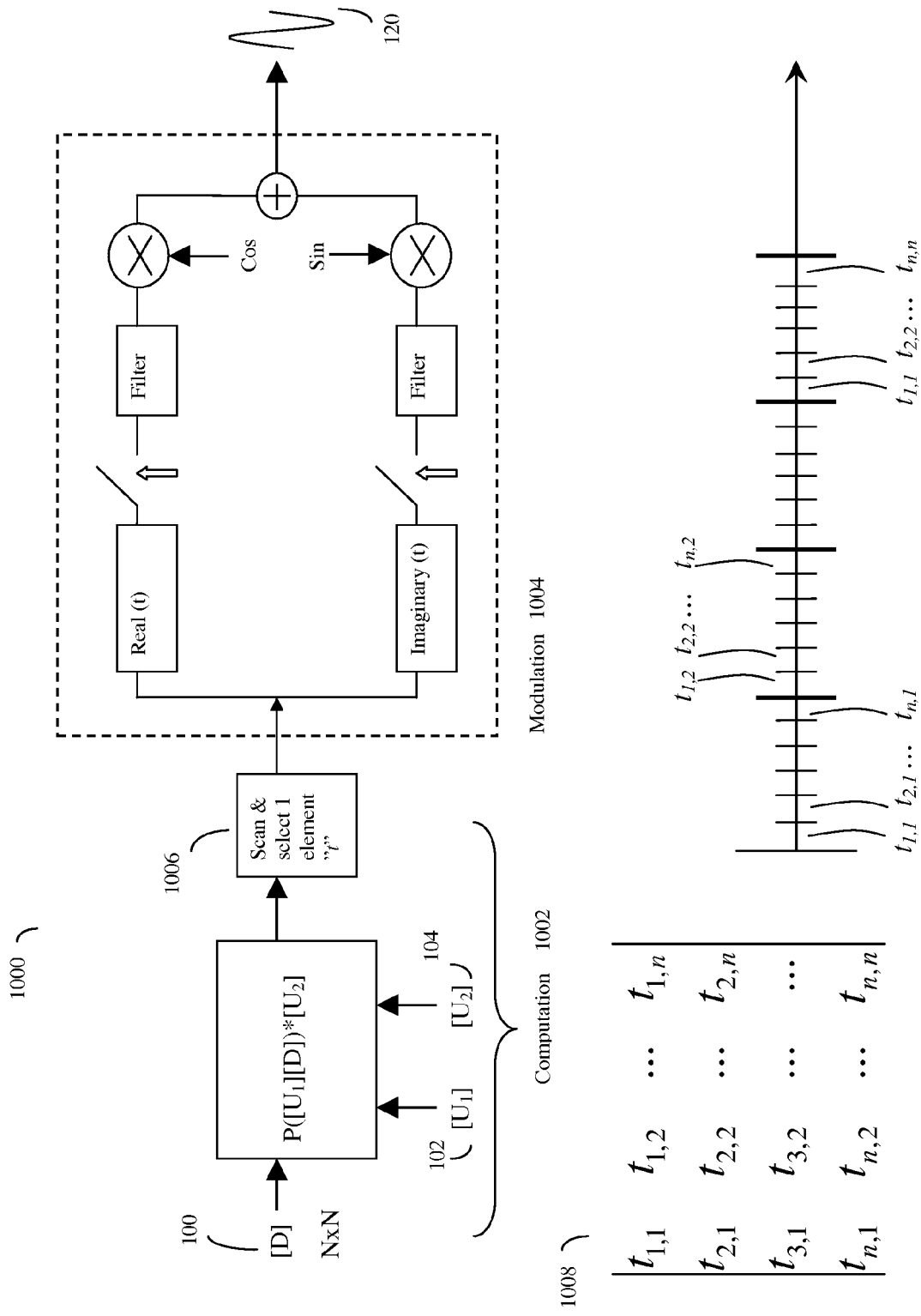
FIG. 10 shows a more detailed diagram of one embodiment of an OTFSSS transmitter.

FIG. 10 shows a more detailed example of one embodiment of an OTFSSS transmitter (1000), previously shown in less detail in FIG. 1. This transmitter can roughly be broken down into a more digitally oriented computation end (1002) and a more analog signal oriented modulation end (1004). At the digital end (1002), a electronic circuit, which may be a microprocessor, digital signal processor, or other similar device will accept as input the data matrix [D] (100) and may either generate or accept as inputs the [$U_1$] (102) and [$U_2$] (104) matrices as well as the optional permutation scheme P. The digital section will then generate the TFSSS matrix. Once generated, individual elements from this matrix will be selected, often by first selecting one column of N elements from the TFSSS matrix, and then scanning down this column and picking out individual elements at a time (1006). Generally one new element will be selected every time slice (112).

Thus every successive time slice, one element from the TFSSS matrix (1008) will be used to control the modulation circuit (1004). In one embodiment of the invention, the modulation scheme will be one where the element will be separated into its real and imaginary components, chopped and filtered, and then used to control the operation of a sin and cosine generator, producing an analog radio waveform (120). This waveform then travels to the receiver where it is demodulated and deconvoluted as previously shown in FIG. 2. Thus in this scheme (again neglecting overhead effects), element $t_{1,1}$ from the first column of the TFSSS matrix can be sent in the first time slice, and the nth element from the first column of the TFSSS matrix can be sent in the last time slice of the first time spreading interval. The next $t_{1,2}$ element from the second column of the TFSSS matrix can be sent in the first time slice of the second time spreading interval, and so on.

Accommodating Multiple Users

As previously discussed, multiple users that are using different transmitters (or simply multiple transmitters) may communicate over the same communications link using the same protocol. Here, each user or transmitter may, for example, select only a small number of data elements in the $N^2$ sized frame of data to send or receive their respective data. As one example, a user may simply select one column of the frame of data for their purposes, and set the other columns at zero. The user's device will then compute TFSSS data matrices and send and receive them as usual.

Accommodating Different Types of Communications Link (Channel) Impairments

As previously discussed, one advantage of the invention's method is increased resistance to communications channel impairments. This resistance to impairments can be improved by further selecting the first N×N time-frequency shifting matrix and the second N×N spectral shaping matrix are selected to minimize the impact of a aberrant transmitter suffering from Doppler shift or frequency shift on the elements of the TFSSS data matrix that are adjacent to the elements of said TFSSS data matrix occupied by said aberrant transmitter. Alternatively, the receiver may analyze the problem, determine if an alternate set of first N×N time-frequency shifting matrices and/or said second N×N spectral shaping matrices would reduce the problem, and suggest or command that corresponding changes be made to corresponding the transmitter(s).

Power and Energy Per Symbol Considerations:

Relative to prior art, the invention also enables more sophisticated tradeoffs between transmission distance, transmitter power, and information data rate. This is because each symbol is spread over more intervals. For example, for TDMA, the power per symbol transmitted must be quite high because the symbol is being transmitted over only one time interval. For CDMA, the symbol is being transmitted over essentially N intervals, and the power per interval is correspondingly less. Because the invention transmits a bit or symbol of information over $N^2$ different modalities (e.g. waveforms, times), the power per modality is much less. Among other things, this means that the effect of impulse noise, that would in general only impact a specific waveform over a specific time interval, will be less. It also means that due to increased number of signal transmission modalities (waveforms, times) enabled by the invention, there are more degrees of freedom available to optimize the signal to best correspond to the particular communications link impairment situation at hand.

The invention claimed is:

1. A method of transmitting and receiving at least one frame of data ([D]) over a communications link, said frame of data comprising a matrix of up to $N^2$ data elements, N being greater than 1, said method comprising:

creating an orthonormal matrix set, said orthonormal matrix set comprising a first N×N matrix ([$U_1$]) and a second N×N matrix ([$U_2$]);

wherein said communications link and said orthonormal matrix set are chosen to be capable of transmitting at least N elements from a matrix product of said first N×N matrix ([$U_1$]), said frame of data ([D]), and said second N×N matrix ([$U_2$]) over one time spreading interval;

said time spreading interval consisting of at least N time slices;

forming a first matrix product of said first N×N matrix ([$U_1$]), and said frame of data ([D]);

permuting said first matrix product by an invertible permutation operation P forming a permuted first matrix product P([$U_1$][D]);

forming a second matrix product of said permuted first matrix product P([$U_1$][D]) and said second N×N matrix ([$U_2$]) forming a convoluted data matrix;

transmitting and receiving said convoluted data matrix over said communications link by the steps of:

1: for each single time-spreading interval, selecting N different elements of said convoluted data matrix;

2: over different said time slices in said time spreading interval, selecting one element from said N different elements of said convoluted data matrix, modulating said one element, and transmitting said one element so that each said one element occupies its own time slice;

3: receiving said N different elements of said convoluted data matrix over different said time slices in said time spreading interval;

4: demodulating said N different elements of said convoluted data matrix;

repeating steps 1, 2, 3, and 4 up to total of N times, thereby reassembling a replica of said convoluted data matrix at the receiver;

using said first N×N matrix ([U₁]) and said second N×N matrix ([U₂]) to reconstruct said frame of data ([D]) from said convoluted data matrix; and wherein an arbitrary data element of an arbitrary frame of data cannot be guaranteed to be reconstructed with full accuracy until said convoluted data matrix has been completely recovered.

2. The method of claim 1, wherein said first N×N matrix ([U₁]) and said second N×N matrix ([U₂]) are selected from the group consisting of 1: said first N×N matrix ([U₁]) is a DFT matrix and said second N×N matrix ([U₂]) is a Hadamard matrix, 2: said first N×N matrix ([U₁]) is a DFT matrix and said second N×N matrix ([U₂]) is a chirp matrix, 3: said first N×N matrix ([U₁]) is a DFT matrix and said second N×N matrix ([U₂]) is a DFT matrix.

3. The method of claim 1, wherein said first N×N matrix ([U₁]) is a time-frequency shifting matrix ([U₁]), and said second N×N matrix ([U2]) is a spectral-shaping matrix ([U₂]).

4. The method of claim 1, wherein after forming a first matrix product of said first N×N matrix ([U1]), and said frame of data ([D]), and permuting said first matrix product by an invertible permutation operation P thereby, forming a permuted first matrix product P([U1][D]) further following the steps comprising:

at said transmitter, using a third unitary N×N matrix ([U3]), which is a DFT matrix or an IDFT matrix, to matrix multiply said permuted first matrix product P([U1][D]); and at said receiver using said third unitary matrix ([U3]) to reconstruct said frame of data ([D]).

5. A method of transmitting and receiving at least one frame of data ([D]) over a communications link, said frame of data comprising a matrix of up to N² data elements, N being greater than 1, said method comprising:

creating an orthonormal time-frequency shifting and spectral shaping matrix set, said orthonormal time-frequency shifting and spectral shaping matrix set comprising a first N×N time-frequency shifting matrix ([U₁]) and a second N×N spectral-shaping matrix ([U₂]);

wherein said communications link and said orthonormal time-frequency shifting and spectral-shaping matrix set are chosen to be capable of transmitting at least N elements from a matrix product of said first N×N time-frequency shifting matrix ([U₁]), said frame of data ([D]), and said second N×N spectral shaping matrix ([U₂]) over one time spreading interval;

said time spreading interval consisting of at least N time slices;

forming a first matrix product of said first N×N time-frequency shifting matrix ([U₁]), and said frame of data ([D]);

permuting said first matrix product by an invertible permutation operation P forming a permuted first matrix product P([U₁][D]);

forming a second matrix product of said permuted first matrix product P([U₁][D]) and said spectral-shaping matrix ([U₂]) forming a time-frequency-shifted spectral-shaping data matrix (TFSSS data matrix);

transmitting and receiving said TFSSS data matrix over said communications link by the steps of:

1: for each single time-spreading interval, selecting N different elements of said TFSSS data matrix;

2: over different said time slices in said time spreading interval, selecting one element from said N different elements of said TFSSS data matrix, modulating said one element, and transmitting said one element so that each said one element occupies its own time slice;

3: receiving said N different elements of said TFSSS data matrix over different said time slices in said time spreading interval;

4: demodulating said N different elements of said TFSSS data matrix;

repeating steps 1, 2, 3, and 4 up to total of N times, thereby reassembling a replica of said TFSSS data matrix at the receiver;

using said first N×N time-frequency shifting matrix ([U₁]) and said second N×N spectral shaping matrix ([U₂]) to reconstruct said frame of data ([D]) from said TFSSS data matrix; and wherein an arbitrary data element of an arbitrary frame of data cannot be guaranteed to be reconstructed with full accuracy until said TFSSS data matrix has been completely recovered.

6. The method of claim 5, in which said first N×N time-frequency shifting matrix ([U₁]) is a Discrete Fourier Transform (DFT) matrix, and the second N×N spectral-shaping matrix ([U2]) is composed of cyclically shifted Legendre symbols.

7. The method of claim 5, in which said first N×N time-frequency shifting matrix ([U₁]) is composed of cyclically shifted Legendre symbols, and the second N×N spectral-shaping matrix ([U2]) is a Discrete Fourier Transform (DFT) matrix.

8. The method of claim 5, wherein said time-frequency shifting matrix ([U1]) and said spectral-shaping matrix ([U2]) are selected from the group consisting of 1: said time frequency shifting matrix ([U1]) is a DFT matrix and said spectral-shaping matrix ([U2]) is a Hadamard matrix, 2: said time-frequency shifting matrix ([U1]) is a DFT matrix and said spectral-shaping matrix ([U2]) is a chirp matrix, 3: said time-frequency-shifting matrix ([U1]) is a DFT matrix and said spectral-shaping matrix ([U2]) is a DFT matrix.

9. The method of claim 5, wherein said orthonormal time-frequency shifting and spectral shaping matrix set are chosen based upon communications link conditions.

10. The method of claim 5, in which a plurality of different transmitters may communicate over said communications link by each selecting different or non-overlapping data elements of said frame of data to use to transmit or receive their respective data.

11. The method of claim 10, wherein said first N×N time-frequency shifting matrix ([U₁]) and said second N×N spectral-shaping matrix ([U₂]) are selected to minimize the impact of a transmitter suffering from Doppler shift or frequency shift on adjacent elements to the elements of said TFSSS data matrix occupied by said transmitter suffering from Doppler shift or frequency shift.

12. The method of claim 10, in which a transmitter suffering from Doppler shift or frequency shift is detected by at least one receiver and instructed to correct for said Doppler shift or said frequency shift.

13. The method of claim 5, in which said first N×N time-frequency shifting matrix ([U1]), is a matrix of Orthogonal Frequency Division Multiplexing (OFDM) spreading codes, and said second N×N spectral-shaping-matrix ([U₂]) is a matrix of Code Division Multiple Access (CDMA) spreading codes.

14. The method of claim 5, in which said permutation operation P is an identity operation.

15. The method of claim 5, in which selecting N different elements of said TFSSS data matrix is done by selecting said N different elements from the columns of said TFSSS data matrix.

16. A method of transmitting at least one frame of data ([D]) over a communications link, said frame of data comprising a matrix of up to $N^2$ data elements, N being greater than 1, said method comprising:
  obtaining a hybrid analog and digital wireless transmitter;
  creating an orthonormal matrix set,
  said orthonormal matrix set comprising a first N×N matrix ($[U_1]$) and a second N×N matrix ($[U_2]$);
  wherein said communications link and said orthonormal matrix set are chosen to be capable of transmitting at least N elements from a matrix product of said first N×N matrix ($[U_1]$), said frame of data ([D]), and said second N×N matrix ($[U_2]$) over one time spreading interval;
  said time spreading interval consisting of at least N time slices;
  forming a first matrix product of said first N×N matrix ($[U_1]$), and said frame of data ([D]);
  permuting said first matrix product by an invertible permutation operation P forming a permuted first matrix product P($[U_1][D]$);
  forming a second matrix product of said permuted first matrix product P($[U_1][D]$) and said second N×N matrix ($[U_2]$) forming a convoluted data matrix;
  transmitting said convoluted data matrix over said communications link by the steps of:
  1: for each single time-spreading interval, selecting N different elements of said convoluted data matrix;
  2: over different said time slices in said time spreading interval, selecting one element from said N different elements of said convoluted data matrix, modulating said one element, and transmitting said one element so that each said one element occupies its own time slice;
  repeating steps 1, and 2, up to total of N times, until said convoluted data matrix has been completely transmitted.

17. The method of claim 16, wherein said hybrid analog and digital wireless transmitter comprises a microprocessor or a digital signal processor.

18. A method of receiving at least one frame of data ([D]) over a communications link, said frame of data comprising a matrix of up to $N^2$ data elements, N being greater than 1, said method comprising:
  obtaining a hybrid analog and digital wireless receiver;
  creating an orthonormal matrix set,
  said orthonormal matrix set comprising a first N×N matrix ($[U_1]$) and a second N×N matrix ($[U_2]$);
  wherein said communications link and said orthonormal matrix set are chosen to be capable of transmitting at least N elements from a matrix product of said first N×N matrix ($[U_1]$), a said frame of data ([D]), and said second N×N matrix ($[U_2]$) over one time spreading interval;
  said time spreading interval consisting of at least N time slices;
  creating a permutation operation P;
  receiving a replica of a convoluted data matrix, formed by the product of a permuted first matrix product and said second N×N matrix ($[U_2]$), over said communications link, wherein said first permuted matrix product is formed by performing a permutation operation on the product of said first N×N matrix ($[U_1]$) and said frame of data ([D]) said receiving over said communications link by the steps of:
  1: for each single time-spreading interval, receiving N different elements of said replica of a convoluted data matrix over different said time slices in said time spreading interval;
  2: demodulating said N different elements of said replica of a convoluted data matrix; repeating steps 1, and 2 up to total of N times, thereby reassembling said replica of said convoluted data matrix at the receiver;
  using said first N×N matrix ($[U_1]$) and said second N×N matrix ($[U_2]$) to reconstruct said frame of data ([D]) from said replica of a convoluted data matrix; and
  wherein an arbitrary data element of an arbitrary frame of data cannot be guaranteed to be reconstructed with full accuracy until a complete replica of a convoluted data matrix has been recovered.

19. The method of claim 18, wherein said hybrid analog and digital wireless receiver comprises a microprocessor or a digital signal processor.

* * * * *